W. E. BELCHER.
WIRE ROPE CLAMP.
APPLICATION FILED MAY 29, 1911.

1,027,234.

Patented May 21, 1912.

WITNESSES:
J. E. Holmes,
Ira J. Wilson

INVENTOR
Wallace E. Belcher.
BY
Linthicum Belt & Fuller
ATTORNEYS

UNITED STATES PATENT OFFICE.

WALLACE E. BELCHER, OF CHICAGO, ILLINOIS.

WIRE-ROPE CLAMP.

1,027,234.  Specification of Letters Patent.  Patented May 21, 1912.

Application filed May 29, 1911. Serial No. 630,059.

*To all whom it may concern:*

Be it known that I, WALLACE E. BELCHER, a citizen of the United States, residing at Chicago, in the county of Cook and State of Illinois, have invented certain new and useful Improvements in Wire-Rope Clamps, of which the following is a specification.

This invention relates to clamps particularly adapted for firmly connecting together or splicing wires, ropes, cables, rods and similar elements and also for attaching or securing one or more of such elements to a fixed support, such as a pole, bracket or similar member.

One of the objects of the invention is the provision of a device of this character which shall present only rounded surfaces to the cables or ropes to be clamped, thereby presenting frictional surfaces of maximum area for engagement with the cables or ropes, thus enabling them to be most effectively clamped and held and also obviating sharp corners or edges which would tend to cut or injure the cables or ropes.

Another object is to provide a device which shall permit the curved portion of the U-shaped clamping bolt to be projected through the main clamping member or link thereby permitting the parts to be assembled without removing the clamping nuts from the bolt.

The invention will be best understood by reference to the following description when taken in connection with the accompanying drawings illustrating preferred embodiments thereof.

Figure 1:
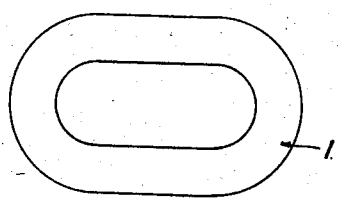
Figure 2:
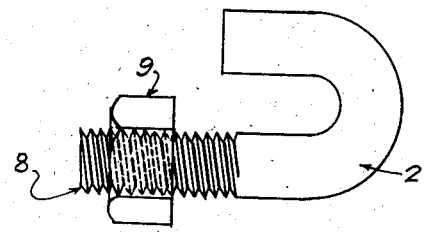
Figure 5:
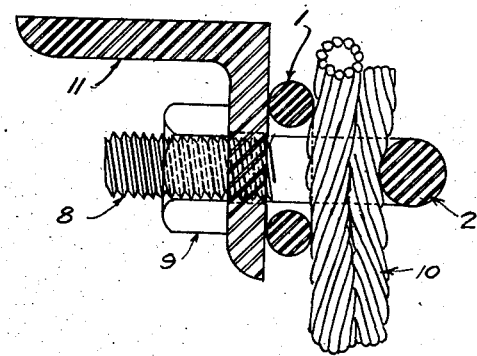
Figure 3:
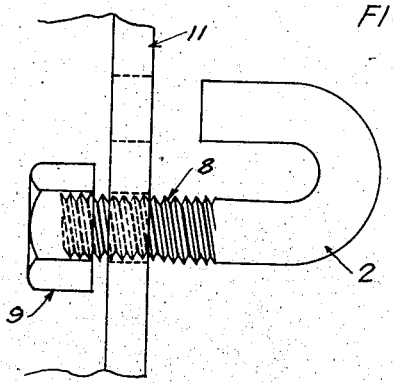
Figure 4:
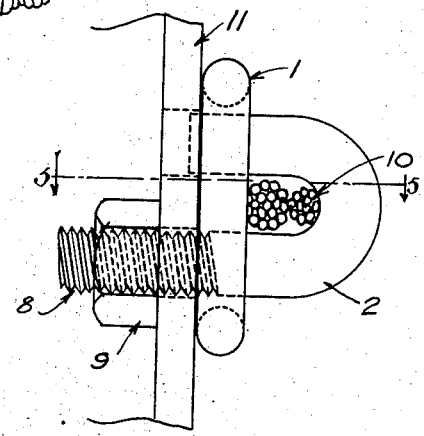

Referring to the drawings: Figure 1 is an elevation of the main clamping member or link; Fig. 2 is an elevation of the U-shaped clamping bolt, one end being threaded and provided with nut; Fig. 3 is a side elevation of a fixed support, such as a steel angle, with the U-shaped bolt in position to receive the link and connecting wires or cables; Fig. 4 is a side elevation of the fixed support, with the device assembled and in use as a supporting and connecting clamp, and Fig. 5 is a sectional view taken on the line 5—5 of Fig. 4, showing position taken by the wires in passing through the clamp, and a cross section of the supporting piece.

On the drawings, 1 designates the body portion of a clamp which is made as shown in the form of an elongated link. The stock or material from which the link is constructed is circular in cross section, thus presenting curved surfaces at all points and eliminating any sharp edges or corners which might tend to cut, fray or injure the cables or ropes to be clamped. A U-shaped clamping bolt 2 is proportioned so that its curved portion may be inserted through the centrally disposed slot of the link 1. This bolt, as shown, has one relatively short leg 7 and a long leg 8, the long leg being threaded for engagement by a nut 9. As shown in Figs. 3, 4 and 5, the clamp is employed to attach or fasten a plurality of cables 10 to a permanent support 11 which is shown in the form of an angle iron and may be secured to a pole, bracket or other rigid support. In utilizing this form of clamp the U-shaped bolt may be first inserted in the hole in the angle iron or other support 11 and the nut 9 threaded part way on as shown in Fig. 3. The link 5 may then be slipped over the curved portion of the bolt and the cables or ropes 10 may then be passed over the end of the short leg 7 so as to be held in place by the curved portion of the bolt. After the wires or cables have been stretched the nut 9 may be turned up to draw the curved portion of the bolt toward the link and thereby clamp the cables between the curved portion of the bolt and the curved surfaces of the link as shown in Fig. 4, the cables being thereby depressed into the elongated slot in the link and firmly and securely clamped in position. The depression and clamping of the cables is clearly shown in Fig. 5.

It may sometimes be desirable to construct the U-shaped bolt with two long legs 8 of equal length, each threaded to receive a clamping nut 9. While this form of the invention may be employed for attaching or connecting cables to a stationary support similar to the form shown in Figs. 3, 4 and 5, it is, however, particularly adapted for connecting or splicing two or more cables or ropes 10. When the U-shaped bolt is drawn down by screwing up the nuts 9 against the link 1 the cables will be drawn into the slot in the link 1, as shown in Fig. 5 and the cables can be clamped as tightly as necessary or desired, by turning up the clamping nuts 9 the required amount. It will be obvious that curved or rounded surfaces only are presented to the cables both on the link and on the U-shaped bolt so that there is no danger or possibility of cutting or fraying the cables such as would result from contact of the cables with sharp corners or edges.

The device is simple in construction and cheap to manufacture and is adapted to be used in connection with one or a number of cables or ropes and is equally efficient when used with either large or small cables, it being obvious that the curved portion of the bolt can be drawn down into the elongated slot in the link as far as may be necessary to securely clamp and hold the cables in position.

I claim:

A wire rope clamp comprising an elongated link formed of material circular in cross-section, providing rounded bearing surfaces for a cable and having a centrally disposed elongated slot, a U-shaped bolt formed of material substantially circular in cross-section to provide rounded bearing surfaces for a cable disposed between said bolt and the link, said bolt having one leg thereof longer than the other to engage with a support, and means for drawing the crown of said bolt toward the link to firmly clamp a cable between the rounded surfaces of said link and bolt.

WALLACE E. BELCHER.

Witnesses:
IRA J. WILSON,
M. ROBERTSON.

Copies of this patent may be obtained for five cents each, by addressing the "Commissioner of Patents, Washington, D. C."